US 8,438,339 B2

(12) United States Patent
Krishna et al.

(10) Patent No.: US 8,438,339 B2
(45) Date of Patent: May 7, 2013

(54) CACHE MANAGEMENT FOR A NUMBER OF THREADS

(75) Inventors: Anil Krishna, Cary, NC (US); Brian M. Rogers, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/633,976

(22) Filed: Dec. 9, 2009

(65) Prior Publication Data

US 2011/0138129 A1 Jun. 9, 2011

(51) Int. Cl.
*G06F 12/00* (2006.01)
(52) U.S. Cl.
USPC ............................................ 711/133; 711/113
(58) Field of Classification Search .................. 711/133, 711/113
See application file for complete search history.

(56) References Cited

U.S. PATENT DOCUMENTS

| 6,128,701 | A | * | 10/2000 | Malcolm et al. ............... 711/133 |
| 6,327,644 | B1 | | 12/2001 | Beardsley et al. |
| 6,728,837 | B2 | | 4/2004 | Wilkes et al. |
| 7,380,065 | B2 | | 5/2008 | Davis et al. |
| 2003/0074525 | A1 | * | 4/2003 | Yamauchi et al. ............ 711/113 |
| 2003/0221069 | A1 | * | 11/2003 | Azevedo et al. .............. 711/136 |
| 2004/0097242 | A1 | * | 5/2004 | Hull et al. .................. 455/456.1 |
| 2005/0125614 | A1 | | 6/2005 | Royer, Jr. |
| 2010/0312970 | A1 | * | 12/2010 | Bell et al. ...................... 711/135 |

OTHER PUBLICATIONS

Rajan et al., "Emulating Optimal Replacement with a Shepherd Cache", 40th IEEE ACM International Symposiumon Microarchitecture, 2007, pp. 445-454.
Qureshi et al., "Set-Dueling-Controlled Adaptive Insertion for High-Performance Caching", IEEE Computer Society, 2008, pp. 91-98.
Qureshi et al., "Adaptive Insertion Polcies for High Performance Caching", ISCA'07 Jun. 2007 San Diego, CA, pp. 1-11.
Kron et al., "Double-DIP: Augmenting DIP with Adaptive Promotion Policies to Manage Shared L2 Caches", 2nd Workshop on CMP Memory Systems and Interconnects (CMP-MSI) Jun. 2008, pp. 1-9.
Srinath et al., "Feedback Directed Prefetching: Improving the Performance and Bandwidth-Efficiency of Hardware Prefetchers", HPCA 2007, IEEE 13th International Symposium on High Performance Computer Architecture, pp. 63-74.

* cited by examiner

*Primary Examiner* — Hashem Farrokh
(74) *Attorney, Agent, or Firm* — Yee & Associates, P.C.; Yuanmin Cai

(57) ABSTRACT

The illustrative embodiments provide a method, a computer program product, and an apparatus for managing a cache. A probability of a future request for data to be stored in a portion of the cache by a thread is identified for each of the number of threads to form a number of probabilities. The data is stored with a rank in a number of ranks in the portion of the cache responsive to receiving the future request from the thread in the number of threads for the data. The rank is selected using the probability in the number of probabilities for the thread.

18 Claims, 9 Drawing Sheets

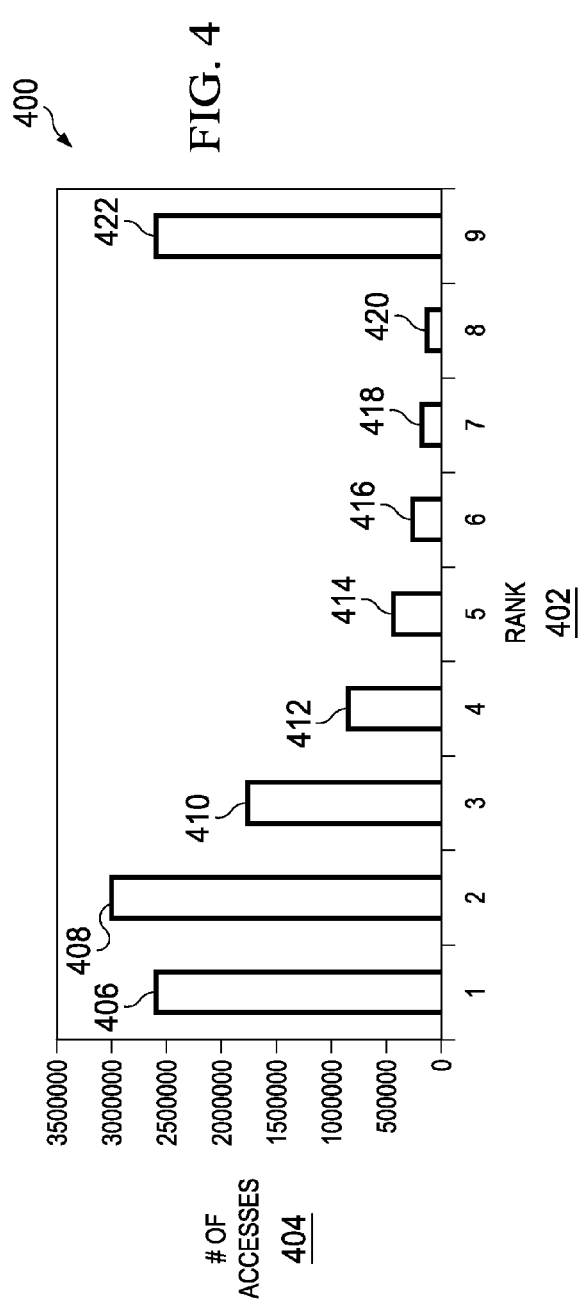
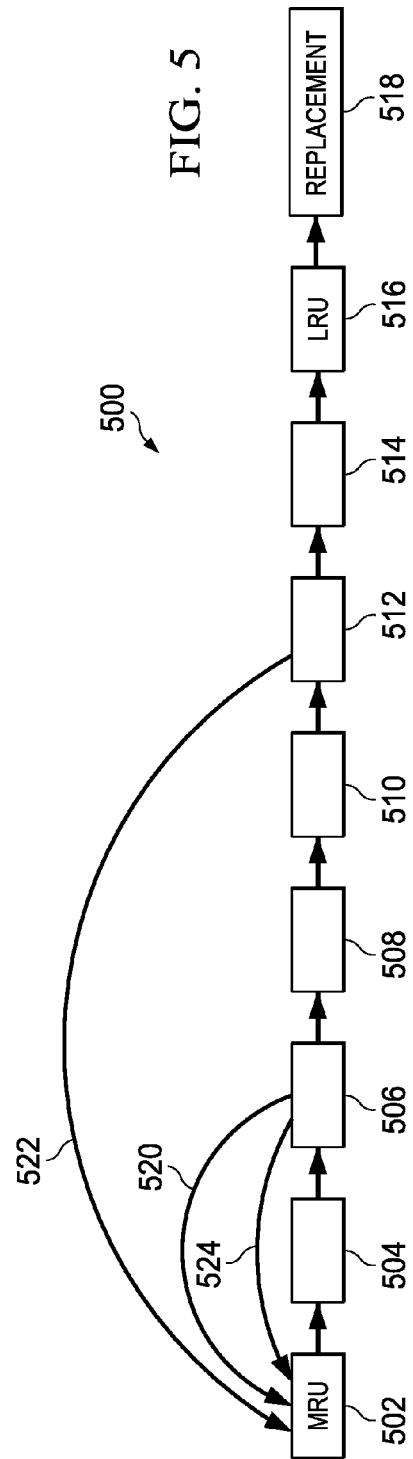

CACHE MANAGEMENT FOR A NUMBER OF THREADS

BACKGROUND

1. Field

The disclosure relates generally to data processing system and more specifically to cache management in data processing systems. Even more specifically, the disclosure relates to insertion of data in a cache.

2. Description of the Related Art

Caches are commonly used in data processing systems to store data for use by one or more processors. When a processor requests data from memory, the data is loaded into the cache from a memory, such as main memory or another cache. A cache may be comprised of memory that has a faster access time than the memory from which the cache is loaded. For example, a level 2 cache has a faster access time than main memory, and a level 1 cache has faster access time than the level 2 cache. In some illustrative examples, data processing systems contain smaller amounts of memory with faster access time to reduce the cost of manufacturing the data processing system.

The data is stored in the cache because a processor may access the same data multiple times. Retrieving the data from the cache is faster than retrieving the data from a lower level cache or main memory. A lower level cache is a cache that is separated from a processor by more levels of cache than a higher level cache. For example, an L2 cache located outside a processor unit is a lower level cache than an L1 cache located within the processor unit.

Because a cache is commonly smaller than the memory from which the cache data is loaded, the cache may implement several techniques to manage the cache. For example, a cache may be associative and be designed with multiple ways. An associative cache with multiple ways is designed such that a particular group of locations in main memory may be stored in any of a particular number of positions within the cache. For example, each cache set in an 8 way associative cache may store data from 8 memory addresses within a particular portion of main memory at a particular time.

Another technique used to manage the cache is a replacement process. In a cache with multiple ways, data in the cache may be overwritten to store data requested by the processor that is not presently stored within the cache. One replacement process is a least recently used (LRU) process. In a cache that implements a least recently used process, the data in each way of a cache is ranked according to the order the data was accessed by a processor unit. In other words, the data in each way is ranked from most recently used to least recently used. When a processor requests data not presently stored in the cache, the data is stored in the position in the way that holds the rank of least recently used.

Cache management is more challenging when multiple threads are running on a processor unit and using the same cache. The threads may not use memory in the same way. For example, one thread may use the same data very frequently, while another thread frequently uses data only once.

SUMMARY

The illustrative embodiments provide a method, a computer program product, and an apparatus for managing a cache. A probability of a future request for data to be stored in a portion of the cache by a thread is identified for each of the number of threads to form a number of probabilities. The data is stored with a rank in a number of ranks in the portion of the cache responsive to receiving the future request from the thread in the number of threads for the data. The rank is selected using the probability in the number of probabilities for the thread.

BRIEF DESCRIPTION OF THE SEVERAL VIEWS OF THE DRAWINGS

FIG. 4 is an illustration of a graph representing a number of accesses for each rank depicted in accordance with an illustrative embodiment.

FIG. 5 is a number of ranks depicted in accordance with an illustrative embodiment.

DETAILED DESCRIPTION

Figure 1:
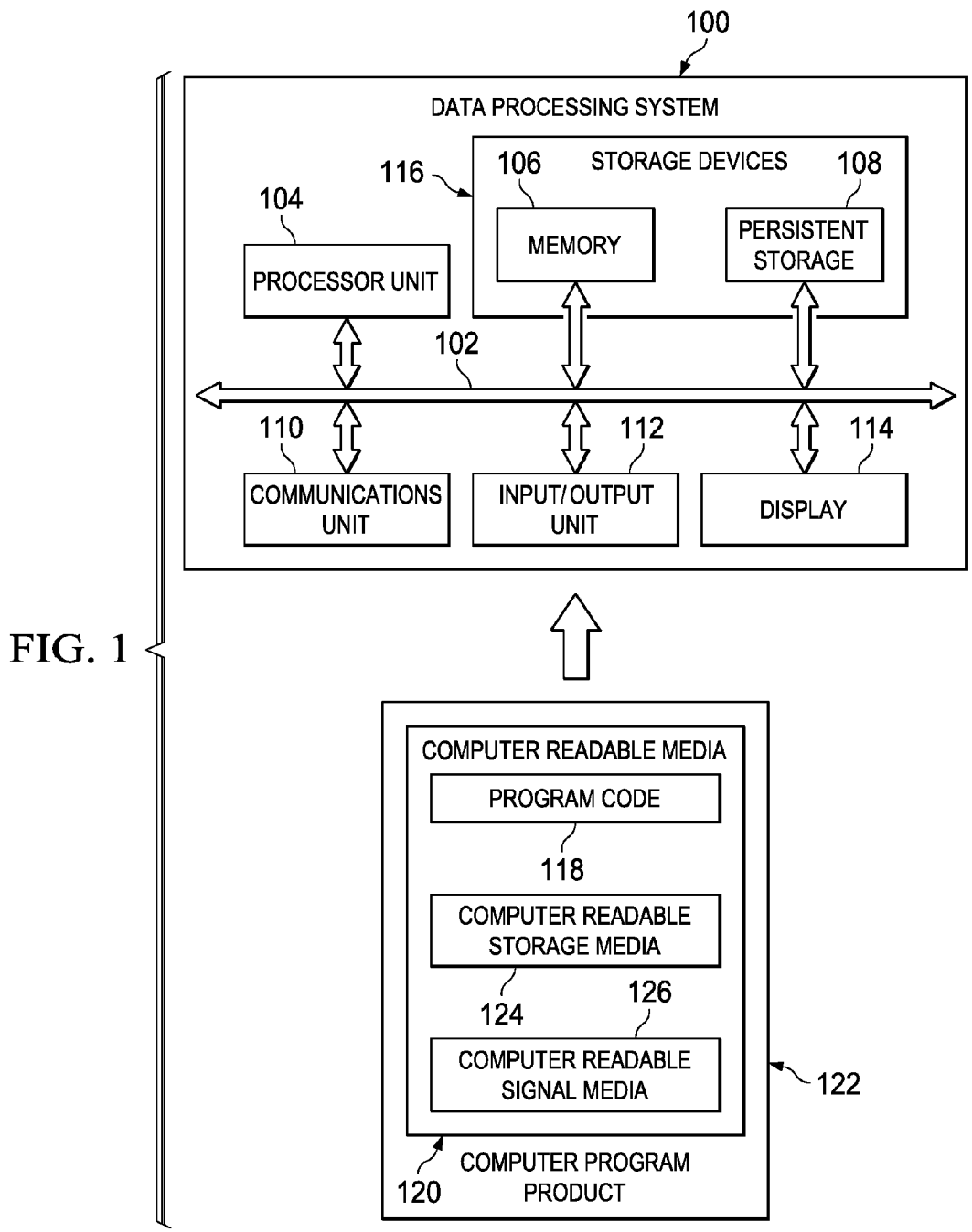
FIG. 1 is a diagram of a data processing system depicted in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions and/or acts specified in the flowchart and/or block diagram block or blocks.

With reference now to the figures and in particular with reference to FIG. 1, an exemplary diagram of data processing environments is provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

With reference now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems, in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory, or any other suitable volatile or non-volatile storage device. Persistent storage 108 may take various forms, depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 may be removable. For example, a removable hard drive may be used for persistent storage 108.

Communications unit 110, in these examples, provides for communication with other data processing systems or devices. In these examples, communications unit 110 is a network interface card. Communications unit 110 may provide communications through the use of either or both physical and wireless communications links.

Input/output unit 112 allows for the input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code, in the different embodiments, may be embodied on different physical or computer readable storage media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122. In one example, computer readable media 120 may be computer readable storage media 124 or computer readable signal media 126. Computer readable storage media 124 may include, for example, an optical or magnetic disc that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory that is connected to data processing system 100. In some instances, computer readable storage media 124 may not be removable from data processing system 100.

Alternatively, program code 118 may be transferred to data processing system 100 using computer readable signal media 126. Computer readable signal media 126 may be, for example, a propagated data signal containing program code 118. For example, computer readable signal media 126 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system through computer readable signal media 126 for use within data processing system 100. For instance, program code stored in a computer readable storage media in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The different illustrative embodiments recognize and take into account a number of considerations. The different illustrative embodiments recognize and take into account that multiple threads may use a cache shared among the multiple threads differently. For example, a first thread may frequently reuse a small amount of data. A second thread may use a large amount of data once without reusing the data. The different illustrative embodiments recognize that a least recently used cache replacement process allows the second thread to cause data being frequently reused by the first thread to be replaced in the cache. Delays may be caused because the first thread may request the same data from the memory again. The second thread also may not benefit from the storage of the data for the second thread in the cache because the second thread does not reuse the data.

The different illustrative embodiments also recognize and take into account that a probability of a thread reusing data in a cache may be identified by monitoring a subset of the cache sets in the cache. Over a particular length of time or number of cache accesses, the probability may be identified by creating a usage profile for the thread. The usage profile is a number of counters associated with the thread that represent the rank of the data in the least recently used cache replacement process. In one illustrative embodiment, a counter for the current rank of the data may be incremented when the data in the cache is requested by the thread. In another illustrative embodiment, the counter for the rank closest to the least recently used rank held by the data while in the cache and before being requested by the thread may be incremented when the data is replaced in the cache.

The different illustrative embodiments also recognize and take into account that a probability density function may be calculated using the counters for the thread. The value for each counter may be divided by the sum of the values for all counters for the thread to form a normalized value for each counter. The normalized values may then be reflected over an axis at the midpoint between lowest rank and highest rank. That is, the normalized value for the lowest rank may become the highest value in the probability density function.

The different illustrative embodiments also recognize and take into account that the probability density function may be used during the next period in the cache sets that are not identifying the probability for a subsequent period. In other words, the cache sets not performing the probability identification may store data requested by the threads with a least recently used rank based on the probability density function. A random number may be generated for the rank of the requested data. The random number is weighted with the probability density function of the thread requesting the data. The data may then be stored in the cache with the rank of the weighted random number.

Figure 2:
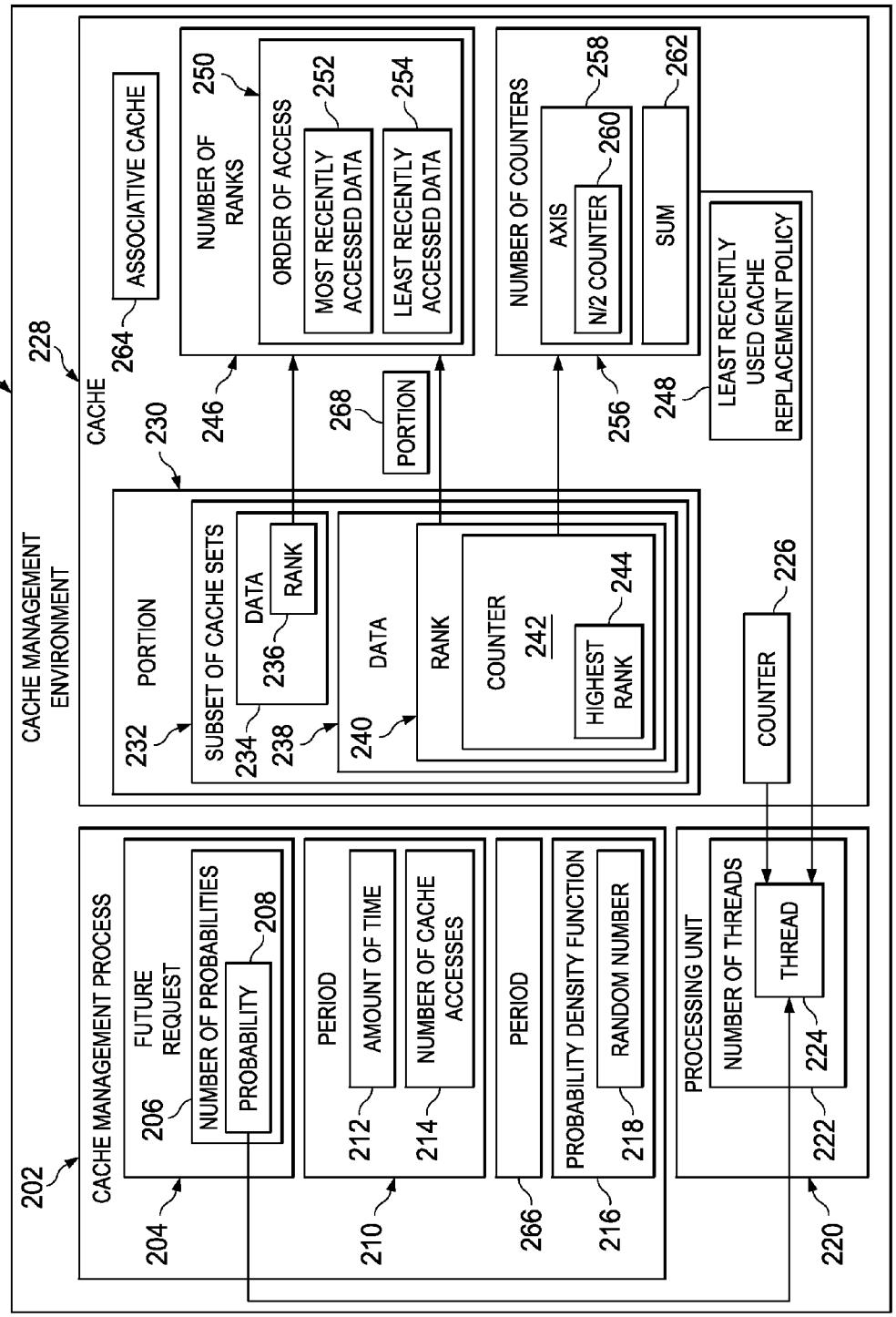
FIG. 2 is a cache management environment depicted in accordance with an illustrative embodiment.

Turning now to FIG. 2, a cache management environment is depicted in accordance with an illustrative embodiment. Cache management environment 200 may be implemented in data processing system 100 in FIG. 1. Components of cache management environment 200 may also be implemented across a number of data processing systems, such as data processing system 100.

Cache management environment 200 contains cache 228, processing unit 220, and cache management process 202. Processing unit 220 is an example of processor unit 104 in FIG. 1. Processor unit 220 runs number of threads 222. Number of threads 222 are tasks that are run on processing unit 220 in a substantially concurrent manner. Thread 224 is a task running on processing unit 220 within number of threads 222.

As used herein, the phrase "at least one of", when used with a list of items, means that different combinations of one or more of the listed items may be used and only one of each item in the list may be needed. For example, "at least one of item A, item B, and item C" may include, without limitation, item A or item A and item B. This example also may include item A, item B, and item C or item B and item C.

Cache 228 is a memory in cache management environment 200. In some illustrative examples, cache 228 stores data, such as data 238 because cache 228 is capable of transferring data 238 to and from processing unit 220 more quickly than another memory or cache. Cache 228 is associated with processing unit 220. In this illustrative example, processing unit 220 is connected to cache 228 such that data in cache 228 may be transferred to and from processing unit 220. In these examples, cache 228 is associative cache 264. Associative cache 264 is a cache 228 that is divided into at least one portion 230. Portion 230 is a section of cache 228. Cache 228 may be divided into cache sets. In these examples, portion 230 is subset of cache sets 232.

A first component is considered to be associated with a second component by being secured to the second component, bonded to the second component, fastened to the second component, and/or connected to the second component in some other suitable manner. The first component also may be connected to the second component through using a third component. The first component is also considered to be associated with the second component by being formed as part of and/or an extension of the second component.

Portion 230 contains data 234 and data 238. Data 234 and data 238 may be copies of data stored in main memory or another cache. In some illustrative embodiments, cache 228 is smaller than a memory or cache from which data 238 is copied. Thus, data 238 may be replaced in portion 230 when additional data is stored in cache 228. In these examples, cache 228 implements least recently used cache replacement policy 248. A policy is a number of rules. A policy may also include parameters. In this illustrative example least recently used cache replacement policy 248 is a policy used to select a candidate for replacement in portion 230. For example, data 238 may be replaced in portion 230 with other data if data 238 is the candidate for replacement.

Cache management process 202 implements least recently used cache replacement policy 248 by selecting a candidate data 238 with rank 240 that meets a criteria. In these examples, the criteria is satisfied when rank 240 represents that data 238 is least recently accessed data 254 in portion 230. Number of ranks 246 represents the ranking for order of access 250 of data 234 and data 238 in portion 230. That is, number of ranks 246 ranks data 234, data 238, and other data stored in portion 230 from most recently accessed data 252 to least recently accessed data 254.

Order of access 250 is the order in which data, such as data 238, in portion 230 was accessed by thread 224. Accessed means reading, writing, or a combination of reading and writing. Most recently accessed data 252 is rank 240 in number of ranks 246 associated with data 238 when data 238 is the data last accessed by processing unit 220. Least recently accessed data 254 is rank 240 in number of ranks 246 associated with data 238 when data 238 was last accessed by processing unit 220 prior to all other data in portion 230.

For example, rank 240 may be stored in number of ranks 246. Number of ranks 246 may be an array of values. The size of the array may be the same as portion 230 such that number of ranks 246 stores a value corresponding to each data 238 in portion 230. In one illustrative embodiment, rank 240 is associated with data 238 by being at the same position within the array of number of ranks 246 as data 238 is within portion 230. For example, if data 238 is located in the third position within an array representing portion 230, rank 240 is associated with data 238 by being stored in the third position in the array representing number of ranks 246.

Data 238 is assigned rank 240 based on order of access 250. In other words, rank 240 associated with data 238 is changed each time another data in portion 230 is accessed or replaced. Rank 240 begins at most recently accessed data 252 and increases toward least recently accessed data 254. When rank 240 is least recently accessed data 254, the value for rank 240 is the size of portion 230.

For example, assume portion 230 contains 8 positions for data, such as data 238. Rank 240 associated with data 238 is set to zero when data 238 is stored in portion 230. When other data, such as data 234, is stored in portion 230, rank 240 associated with data 238 is set to 1. In this example, the value of rank 240 when rank 240 is least recently accessed data 254 is 8 because portion 230 has 8 positions for data 238. As additional data is stored in portion 230, rank 240 associated with data 238 is incremented until rank 240 is 8. The additional data may overwrite data presently stored in portion 230, such as data 234. When another data in portion 230 is accessed by processing unit 220, data 238 is replaced with the requested data. Rank 240 for the requested data is set to most recently accessed data 252. In this example, rank 240 is set to 0.

Cache management process 202 monitors requests in cache 228. Cache management process 202 may be run by processing unit 220. Alternatively, cache management process 202 may be implemented using a number of gates, including, but not limited to, AND gates, OR gates, and XOR gates. Cache management process 202 may perform the monitoring for period 210. Period 210 may be amount of time 212, number of cache accesses 214, or another suitable measurement. For example, period 210 may be 900 accesses of cache 228 by processing unit 220. The accesses may be performed by thread 224 in number of threads 222.

Cache management process 202 monitors requests in cache 228 to identify number of probabilities 206. Number of probabilities 206 are probability 208 of each thread 224 in number of threads 222 accessing data, such as data 238, in future request 204. Future request 204 is an operation of thread 224 that has not yet occurred. The operation may be a read, a write, or a combination of reads and writes. Probability 208 is a likelihood that thread 224 requests data, such as data 234, after the data is already stored in portion 230. In other words, probability 208 is the likelihood that thread 224 reuses data that has been requested while the data is stored in the cache.

Probability 208 is identified by cache management process 202 using number of counters 256. Number of counters 256 are values associated with thread 224 and a rank, such as rank 240. For example, counter 242 is in number of counters 256 and associated with rank 240. In one illustrative embodiment, cache management process 202 begins counter 242 at zero.

Cache management process 202 increments counter 242 associated with rank 240 each time data 238 with rank 240 is accessed by thread 224.

For example, data 238 is at rank 240. Other data in portion 230 is then accessed by thread 224. Assume rank 240 of data 238 represents that rank 240 is least recently accessed data 254. Thread 224 accesses data 238. In response to thread 224 accessing data 238, cache management process 202 increments counter 242 associated with rank 240. In this example, cache management process 202 increments counter 242 associated with rank 240 that represents least recently accessed data 254.

In some illustrative embodiments, counter 226 is also present. Counter 226 is associated with an access of data not presently stored in portion 230. In other words, counter 226 is associated with a cache miss. Cache management process 202 increments counter 226 each time thread 224 requests data not presently stored in portion 230.

In another illustrative embodiment, cache management process 202 begins counter 242 at zero. Cache management environment 202 increments counter 242 each time data 238 is replaced in portion 230. Data 238 may be replaced by being overwritten with data from a memory. For example, the memory may be persistent storage 108 in FIG. 1.

Cache management process 202 increments counter 242 associated with highest rank 244 held by data 238. Highest rank 244 is rank 240 farthest from most recently accessed data 252 held by data 238 before being accessed by 224.

For example, assume cache 228 is an 8-way associative cache. Rank 240 is 1 when data 238 is most recently accessed data 252. Rank 240 is 8 when data 238 is least recently accessed data 254. In this example, data 238 is stored in portion 230 with rank 240 of 1. Assume two other data are then stored in portion 230. Rank 240 of data 238 is then 3. In this example, data 238 is then accessed by thread 224. Cache management process 202 detects the access of data 238 and sets highest rank 244 to 3.

In this example, other data is stored in portion 230 until rank 240 becomes 8. When rank 240 is 8, rank 240 is also least recently accessed data 254. When additional data is stored in portion 230, data 238 is overwritten in portion 230. Cache management process 202 then increments counter 242 associated with rank 3.

In some illustrative embodiments, counter 226 is also present. Counter 226 is incremented when data 238 is stored in portion 230 but not subsequently accessed by thread 224. Cache management process 202 continues identifying probability 208 until period 210 expires. Period 210 may be an amount of time 212, a number of cache accesses 214, or another suitable period.

Once period 210 has expired, cache management process 202 generates probability density function 216 for each thread 224 in number of threads 222. Probability density function 216 is a function that describes number of probabilities 206 for number of threads 222. Cache management process 202 generates probability density function 216 by dividing the value of each counter in number of counters 256 by sum 262. Sum 262 is a value found by adding the values for the counters in number of counters 256.

Cache management process 202 then reflects number of counters 256 over axis 258. Axis 258 may be located at n/2 counter 260. N/2 counter is counter 242 representing rank 240 associated with a midpoint between most recently accessed data 252 and least recently accessed data 254. For example, if cache 228 is an 8-way associative cache, n/2 counter 260 is at counter 242 associated with rank 240 of 4.

Reflecting number of counters 256 over axis 258 means that number of counters 256 is inverted such that the value associated with the rank 240 for most recently accessed data 252 in probability density function 216 was the value associated with the rank 240 for least recently accessed data 252 in number of counters 256.

For example, in an 8-way associative cache where rank 1 is most recently accessed data 252 and rank 8 is least recently accessed data 254, counter 242 associated with rank 1 is reflected across axis 258 in probability density function 216. Counter 242 for rank 1 is thus assigned to rank 8 in probability density function 216 and counter 242 for rank 8 is assigned to rank 1 in probability density function 216. Likewise, counter 242 associated with rank 2 in number of counters 256 is assigned to rank 7 in probability density function 216 and counter 242 associated with rank 7 in number of counters 256 assigned to rank 2. Cache management process 202 continues reflecting number of counters 256 across axis 258 to form probability density function until all counters 242 in number of counters 256 are reflected.

Once probability density function 216 is generated, probability density function 216 is applied to cache 228 for period 266. Period 266 follows period 210. For example, if period 210 is amount of time 212, and amount of time 212 is 1 second, period 266 is amount of time 212 of 1 second that follows period 210. In some illustrative embodiments, probability density function 216 is applied to portion 268 of cache 228. In such illustrative embodiments, the cache management process continues to monitor portion 230 during period 266 while applying probability density function 216 to portion 268 and/or other portions of cache 228 during period 266.

Applying probability density function 216 means that each time thread 224 accesses data in portion 268, cache management process 202 generates random number 218. Random number 218 is weighted using probability density function 216. In other words, random number 218 is more likely to be a number for which probability density function has a higher value than a number for which probability density function has a lower value. For example, if probability density function 216 contains rank 1 with a value of 20 and rank 2 with a value of 10, random number 218 is twice as likely to be rank 1 than rank 2.

Cache management process 202 assigns a rank to the requested data in portion 268. For example, if cache 228 is a 2-way associative cache and random number 218 is 2, the rank of the data in portion 268 is set to 2. In other words, the rank is set to least recently accessed data 254. In this example, if thread 224 requests data not presently stored in portion 268, the data is overwritten because the data holds the rank of least recently accessed data 254.

In another illustrative example, thread 224 requests data already present in portion 268. In such an example, cache management process 202 generates random number 218. Random number 218 is weighted using probability density function 216. The rank of the data already present in portion 268 is then set to the value of random number 218. In other words, the rank of the data is updated in response to being accessed by thread 224.

The illustration of cache management environment 200 is not meant to imply physical or architectural limitations to the manner in which different features may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, cache 228 may contain additional portions 230. In such illustrative embodiments, probability density function 216 may be applied to the other portions of cache 228 while cache management process 202 monitors accesses by thread 224 in portion 230. Additionally probability density function 216 may be generated for each thread 224 in number of threads 222. Thus, when data 234 is stored in portion 230 after being requested, rank 236 associated with data 234 is set according to probability density function 216 for whichever thread 224 in number of threads 222 that requested data 234.

Figure 3:
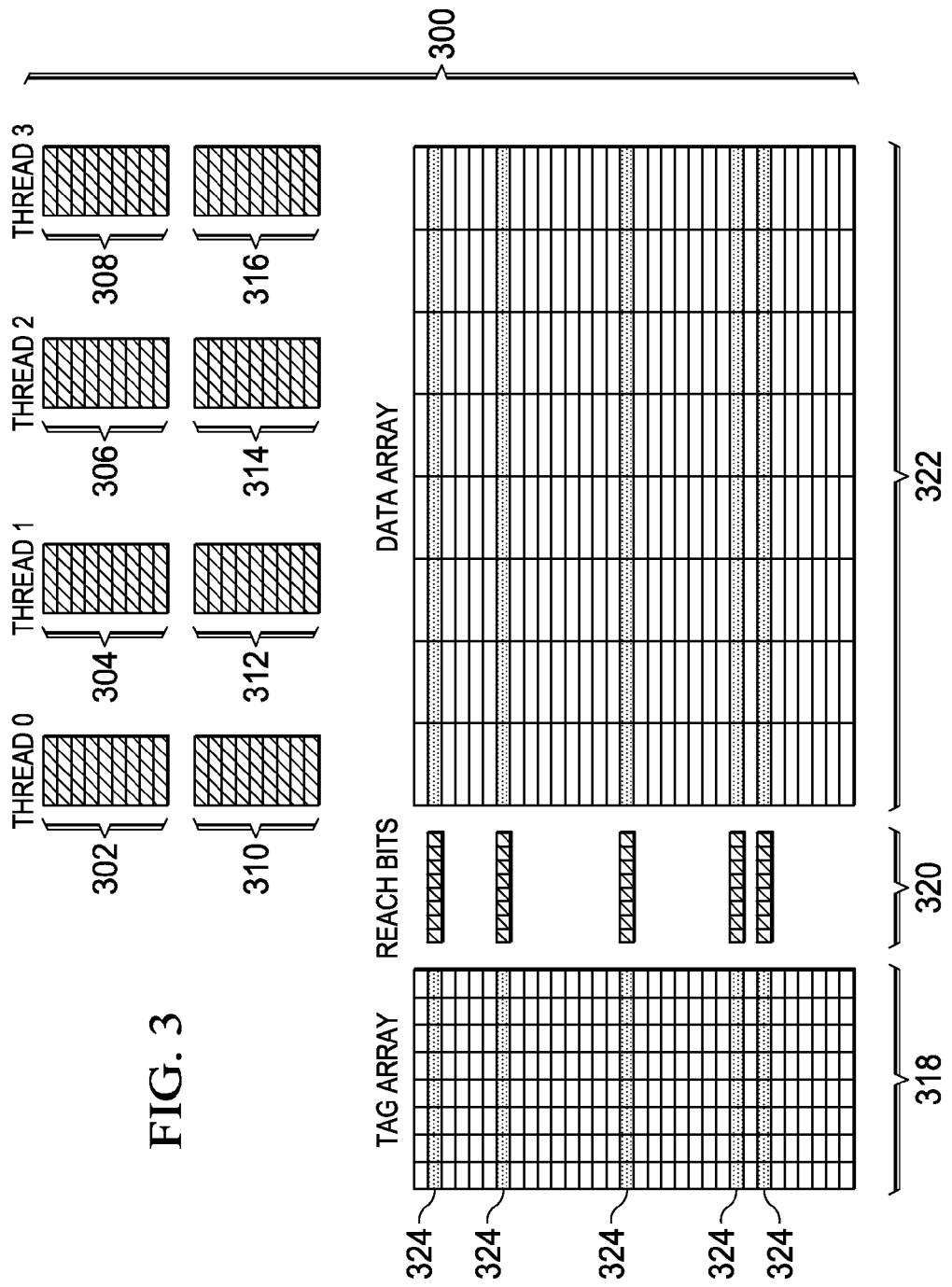
FIG. 3 is an illustration of a cache depicted in accordance with an illustrative embodiment.

Turning now to FIG. 3, an illustration of a cache is depicted in accordance with an illustrative embodiment. Cache 300 may be an example implementation of cache 228 in FIG. 2. In this illustrative embodiment, cache 300 contains tag arrays 318, reach bits 320, data arrays 322, probability density functions 302-308, and counters 310-316.

Tag arrays 318 are arrays of values that indicate the memory addresses for the data stored in data arrays 322. When data in the cache is requested by a thread, a particular address in memory may be included in the request. A cache controller may search tag arrays 318 or a portion of tag arrays 318 for the address in the request. If the address is located in tag arrays 318, the corresponding entry in data arrays 322 is returned to the thread. Thus, data arrays 322 are arrays that contain data from memory or another cache. The memory addresses from which the data in data arrays 322 was copied are stored in the corresponding locations in tag arrays 318.

In this illustrative example, cache lines 324 are example implementations of portion 230 and/or subset of cache sets 232 in FIG. 2. A cache management process generates a probability density function for each thread, based on accesses to the data in cache 300 by the thread. In one illustrative example, cache lines 324 comprise approximately 5% of the cache lines in cache 300. Cache lines 324 implement a least recently used replacement policy, such as least recently used cache replacement policy 248.

In these examples, a cache management process generates probability density function 302 based on accesses by thread0, probability density function 304 based on accesses by thread1, probability density function 306 based on accesses by thread2, and probability density function 308 based on accesses by thread3 to cache lines 324. Probability density functions 302-308 may each be an array of values with a size equal to the number of ways in cache 300. Probability density functions 302-308 may be stored, for example, in a static random access memory (SRAM).

Counters 310-316 are each arrays that contain values representative of the cache access behavior with respect to cache lines 324 for a particular thread. Counters 310-316 may be set to contain zeroes at the beginning of a particular period. More specifically, counter 310 is an array containing values representing the accesses of cache lines 324 by thread0. In one illustrative embodiment, the cache management process increments the value in the location within counter 310 that represents the rank of the data accessed by thread0 at the time of the access.

In another illustrative embodiment, the cache management process increments a value within counter 310 at the time data in cache lines 324 is replaced. The value within counter 310 that is incremented is stored in the location within counter 310 that represents the reach of the data being replaced. The reach of the data being replaced is the highest rank held by the data prior to being accessed by thread0. The highest rank is an example of highest rank 244 from FIG. 2.

The reach of the data may be stored in reach bits 320. In this illustrative embodiment, reach bits 320 comprise an array of values the same size as data array 322 for a particular cache set in cache sets 324. In other words, in an 8-way associative cache, reach bits 320 may be an array of size 8. The reach bits may be stored in a static random access memory (SRAM). The static random memory may be located within cache 300 or outside cache 300.

For example, assume cache 300 is an 8-way associative cache. The rank of a first data is 1 when the data holds the rank of most recently accessed data. The rank of the first data is 8 when the first data is the least recently accessed data in one of cache sets 324. In this example, the first data is stored in the one of cache sets 324 with the rank of 1. Assume two other data are then stored in the particular cache set in cache sets 324. After the two other data are stored in the particular cache set, the rank of the first data is 3. In this example, the first is then accessed by the thread that requested the first data. The process detects the access of the first and sets the highest rank of the first data to 3 in the position within reach bits 320 corresponding to the location of the first data within data array 322.

Likewise, counter 312 is an array containing values representing the accesses of cache lines 324 by thread1, counter 314 is an array containing values representing the accesses of cache lines 324 by thread2, counter 316 is an array containing values representing the accesses of cache lines 324 by thread2, and counter 318 is an array containing values representing the accesses of cache lines 324 by thread4.

Turning now to FIG. 4, an illustration of a graph representing a number of accesses for each rank is depicted in accordance with an illustrative embodiment. The graph may be representative of each counter 242 in number of counters 256. The accesses may be accesses of cache 228 by thread 224 in FIG. 2.

Graph 400 represents a number of accesses for each rank, such as rank 240, by a particular thread in an 8-way associative cache. Graph 400 is representative of an illustrative embodiment in which a cache management process increments the counter associated with a rank each time the particular rank is accessed by a particular thread. Rank axis 402 is a horizontal axis that represents the rank held by data accessed by the thread at the time the data is accessed. Number of accesses axis 404 is a vertical axis representing the number of accesses of data with the particular rank for the thread.

In this illustrative example, bar 406 represents the number of accesses of data in the cache that had rank 1 at the time the data was accessed by the thread. Bar 406 indicates that approximately 2,600,000 accesses of data with rank 1 were recorded for the thread. Bar 408 represents the number of accesses of data in the cache that had rank 2 at the time the data was accessed by the thread. Bar 408 indicates that approximately 3,000,000 accesses of data with rank 2 were recorded for the thread.

Bar 410 represents the number of accesses of data in the cache that had rank 3 at the time the data was accessed by the thread. Bar 410 indicates that approximately 1,750,000 accesses of data with rank 3 were recorded for the thread. Bar 412 represents the number of accesses of data in the cache that had rank 4 at the time the data was accessed by the thread. Bar 412 indicates that approximately 800,000 accesses of data with rank 4 were recorded for the thread.

Bar 414 represents the number of accesses of data in the cache that had rank 5 at the time the data was accessed by the thread. Bar 414 indicates that less than 400,000 accesses of data with rank 5 were recorded for the thread. Bar 416 represents the number of accesses of data in the cache that had rank 6 at the time the data was accessed by the thread. Bar 416 indicates that approximately 250,000 accesses of data with rank 6 were recorded for the thread.

Bar 418 represents the number of accesses of data in the cache that had rank 7 at the time the data was accessed by the thread. Bar 418 indicates that approximately 100,000 accesses of data with rank 7 were recorded for the thread. Bar 420 represents the number of accesses of data in the cache that had rank 8 at the time the data was accessed by the thread. Bar 420 indicates that approximately 100,000 accesses of data with rank 8 were recorded for the thread.

Bar 422 represents the number of requests by the thread for data that was not present in the cache at the time of the request. In this illustrative example, bar 422 is indicated as rank 9 because the maximum rank in the 8-way cache is 8. Bar 422 may be an example representation of counter 226 in FIG. 2. Bar 422 indicates that more than 3,000,000 accesses of data not present in the cache were recorded for the thread. In this illustrative example, bars 406-422 indicate that the thread frequently accesses the same data several times repeatedly or substantially repeatedly, and then infrequently accesses the data until it is no longer stored in the cache.

Figure 6:
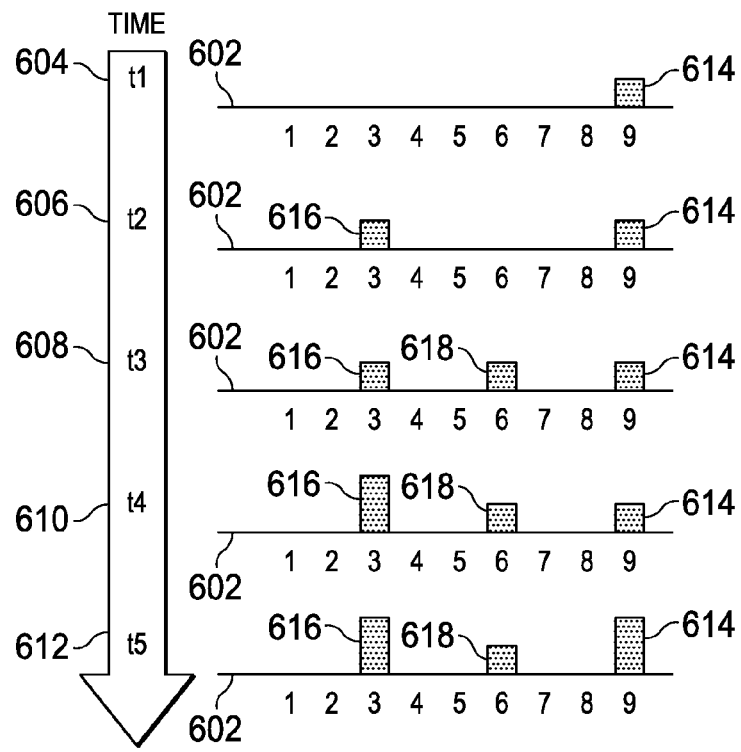
FIG. 6 is an illustration of a number of counters depicted in accordance with an illustrative embodiment.
Figure 7:
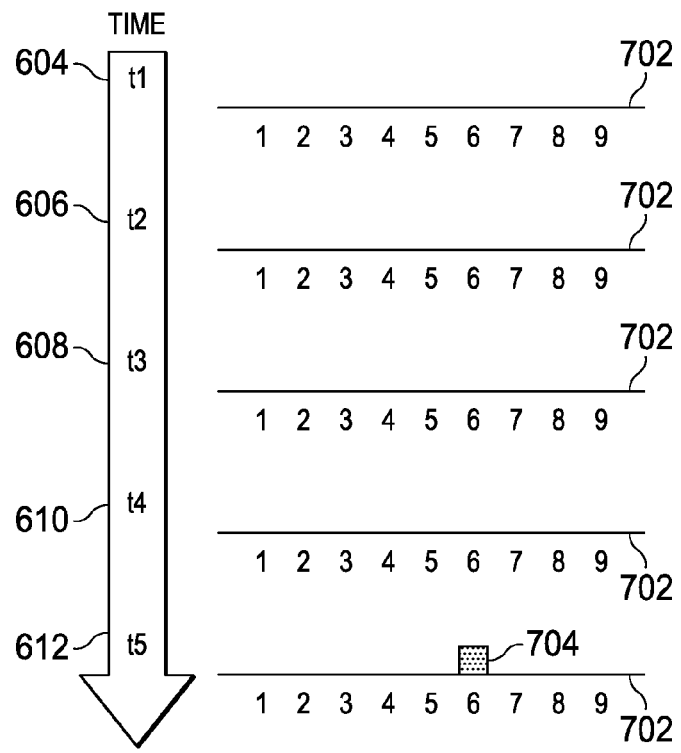
FIG. 7 is an illustration of a second number of counters illustrated in accordance with an illustrative embodiment.

Turning now to FIGS. 5-7, an example of cache management for a number of threads is depicted in accordance with an illustrative embodiment.

With specificity to FIG. 5, a number of ranks are depicted in accordance with an illustrative embodiment. Number of ranks 500 may be an example implementation of number of ranks 246 in FIG. 2. Number of ranks 500 may be set by a cache management process, such as cache management process 202, in a cache management environment, such as cache management environment 200. In this illustrative embodiment, number of ranks 500 ranks data in an 8-way associative cache. However, any suitable number of ways may be in the cache.

Rank 502 is designated as rank 1. In this illustrative embodiment, rank 502 is assigned to data that is the most recently accessed data in the portion of the cache represented by number of ranks 500. The most recently accessed data is an example implementation of most recently accessed data 252 in FIG. 2. In an illustrative embodiment, rank 502 is assigned to data that was most recently copied from memory and stored in the portion of the cache.

Rank 504 is designated rank 2 and represents the next most recently accessed data in the portion of the cache represented by number of ranks 500. The rank of data with rank 502 is set to rank 504 when other data is copied from memory into the cache. Likewise, rank 506 represents rank 3 and the next most recently accessed data in the portion of the cache after rank 504, rank 508 represents rank 4 and the next most recently accessed data in the portion of the cache after rank 506, rank 510 represents rank 5 and the next most recently accessed data in the portion of the cache after rank 508, rank 512 represents rank 6 and the next most recently accessed data in the portion of the cache after rank 61, rank 514 represents rank 7 and the next most recently accessed data in the portion of the cache after rank 512, and rank 516 represents rank 8 and the next most recently accessed data in the portion of the cache after rank 514.

Replacement 518 is a result of data holding rank 516 and other data being copied from memory and stored in the cache. That is, once data is the least recently accessed data and additional data is stored in the cache, data holding rank 516 is overwritten in replacement 518.

Access 520 represents an access in the portion of the cache of the data holding rank 506. An access may be a read operation, a write operation, or a read and a write operation. The data holding rank 506 is then assigned rank 502 to represent that the data is the most recently accessed data in the portion of the cache. The ranks of data in the portion of the cache with a rank closer to rank 502 than the data holding rank 506 are set one rank closer to rank 516. For example, data holding rank 502 is assigned rank 504. Access 524 is an additional access of data holding rank 506 like access 520. Likewise, access 522 represents an access in the portion of the cache of the data holding rank 512. The data holding rank 512 is then assigned rank 502 and the ranks of data in the portion of the cache with a rank closer to rank 502 than the data holding rank 506 are set one rank closer to rank 516.

Turning now to FIG. 6, an illustration of a number of counters is depicted in accordance with an illustrative embodiment. Number of counters 602 is an example implementation of number of counters 256 in FIG. 2. Number of counters 602 may be incremented by a cache management process, such as cache management environment 200.

Number of counters 602 comprises a counter for each rank in number of ranks 500. In other words, column 1 in number of counters 602 represents rank 502, column 2 in number of counters 602 represents rank 504, and so on. Rank 9 in number of counters 602 represents a cache miss. In other words, rank 9 in number of counters 602 represents a request for data by the thread that was not present in the cache at the time of the request.

In this illustrative example, number of counters 602 is set to zero at the beginning of each period. The period is an example implementation of period 210 of FIG. 2. In these examples, the period consists of time t1 604, time t2 606, time t3 608, time t4 610, and time t5 612.

In this illustrative example, assume first data is requested by the thread at time t1 604 and that the first data is not present in the cache. The first data is stored in the cache and assigned rank 502. Because the first data was not present in the cache at the time of the request, the counter for rank 9 in number of counters 602 is incremented to 1. The value of the counter is represented by bar 614.

Assume that at time t2 606, second data presently stored in the portion of the cache with rank 506 is requested by the thread. The second data is reassigned rank 502 and the counter for the rank of the third data at the time of the request is incremented. Reassigning the rank of the second data to rank 502 is represented by access 520. Because the second data was present in the cache at the time of the request, the counter for rank 3 in number of counters 602 is incremented to 1. The value of the counter is represented by bar 616. The rank of the first data is changed from rank 502 to rank 504.

Assume that at time t3 608, third data presently stored in the portion of the cache with rank 512 is requested by the thread. The third data is reassigned rank 502 and the counter for the rank of the third data at the time of the request is incremented. Reassigning the rank of the third data to rank 502 is represented by access 522. In other words, because the third data was present in the cache at the time of the request, the counter for rank 6 in number of counters 602 is incremented to 1. The value of the counter is represented by bar 618. The rank of the first data is changed from rank 504 to rank 506. The rank of the second data is changed from rank 502 to rank 504.

Assume that at time t4 610, fourth data presently stored in the portion of the cache with rank 506 is requested by the thread. The fourth data is reassigned rank 502 and the counter for the rank of the fourth data at the time of the request is incremented. Reassigning the rank of the third data to rank 502 is represented by access 524. In other words, because the fourth data was present in the cache at the time of the request, the counter for rank 3 in the number of counters 602 is incremented to 2. The value of the counter is represented by bar 616. The rank of the first data is changed from rank 506 to rank 508. The rank of the second data is changed from rank 504 to rank 506. The rank of the third data is changed from rank 502 to rank 504.

Assume that at time t5 612, fifth data not presently stored in the portion of the cache is requested by the thread. Also assume that the portion of the cache has no empty data positions. Because the portion of the cache has no empty data positions, data in the portion of the cache is replaced. The data presently holding rank 516 is replaced in replacement 518. The fifth data is then stored in the cache by overwriting the data holding rank 516. The fifth data is assigned rank 502 and the counter for cache misses is incremented because fifth data was not stored in the cache at the time of the request. In this illustrative example, cache misses are represented in number of counters at rank 9. The counter for rank 9 in number of counters 602 is incremented to 2. The value of the counter is represented by bar 614. The rank of the first data is changed from rank 508 to rank 510. The rank of the second data is changed from rank 506 to rank 508. The rank of the third data is changed from rank 504 to rank 506. The rank of the fourth data is changed from rank 502 to rank 504.

With specificity to FIG. 7, an illustration of a second number of counters is illustrated in accordance with an illustrative embodiment. Number of counters 702 is an example implementation of number of counters 256 in FIG. 2. Number of counters may be incremented by a cache management process, such as cache management environment 200.

Number of counters 702 comprises a counter for each rank in number of ranks 500. In other words, column 1 in number of counters 702 represents rank 502, column 2 in number of counters 702 represents rank 504, and so on. A counter in number of counters 702 are incremented when data is replaced in the portion of the cache ranked by number of ranks 500. The counter in number of counters 702 that is incremented is the counter representing the highest rank in the portion of the cache held by the data prior to being accessed by the thread. For example, data stored in the cache and accessed again when the data holds rank 506 would be assigned a highest rank of 3.

However, in this illustrative embodiment, rank 9 in number of counters 702 represents data that was not assigned a highest rank. In other words, rank 9 in number of counters 702 represents data that was stored in the cache as a result of a request from a thread and replaced in the cache without being accessed again by the thread.

In this illustrative example, number of counters 702 is set to zero at the beginning of each period. The period is an example implementation of period 210 in FIG. 2. In these examples, the period consists of time t1 604, time t2 606, time t3 608, time t4 610, and time t5 612.

In this illustrative example, assume first data is requested by the thread at time t1 604 and that the first data is not present in the cache. The first data is stored in the cache and assigned rank 502. No counters are incremented because no data was replaced in the portion of the cache.

Assume that at time t2 606, second data presently stored in the portion of the cache with rank 506 is requested by the thread. The second data is reassigned rank 502. Reassigning the rank of the second data to rank 502 is represented by access 520. No counters are incremented because no data was replaced in the portion of the cache. The rank of the first data is changed from rank 502 to rank 504.

Assume that at time t3 608, third data presently stored in the portion of the cache with rank 512 is requested by the thread. The third data is reassigned rank 502. Reassigning the rank of the third data to rank 502 is represented by access 522. No counters are incremented because no data was replaced in the portion of the cache. The rank of the first data is changed from rank 504 to rank 506. The rank of the second data is changed from rank 502 to rank 504.

Assume that at time t4 610, fourth data presently stored in the portion of the cache with rank 506 is requested by the thread. The fourth data is reassigned rank 502. Reassigning the rank of the third data to rank 502 is represented by access 624. No counters are incremented because no data was replaced in the portion of the cache. The rank of the first data is changed from rank 506 to rank 508. The rank of the second data is changed from rank 504 to rank 506. The rank of the third data is changed from rank 502 to rank 504.

Assume that at time t5 612, fifth data not presently stored in the portion of the cache is requested by the thread. Also assume that the portion of the cache has no empty data positions at the time the fifth data is requested. Because the portion of the cache has no empty data positions, data in the portion of the cache is replaced. The data presently holding rank 516 is replaced in replacement 518. The fifth data is then stored in the cache by overwriting the data holding rank 516.

The counter in number of counters 702 representing the highest rank held by the data being replaced prior to being accessed by the thread is incremented. In this illustrative example, assume the data was accessed by the thread once when the rank held by the data was rank 512, but the data was not accessed while it was in rank 514 or 516. Thus, the counter associated with rank 6 is incremented to 1. Bar 704 represents the value of 1 for the counter representing rank 6.

The fifth data is assigned rank 502. The rank of the first data is changed from rank 508 to rank 510. The rank of the second data is changed from rank 506 to rank 508. The rank of the third data is changed from rank 504 to rank 506. The rank of the fourth data is changed from rank 502 to rank 504.

Figure 8:
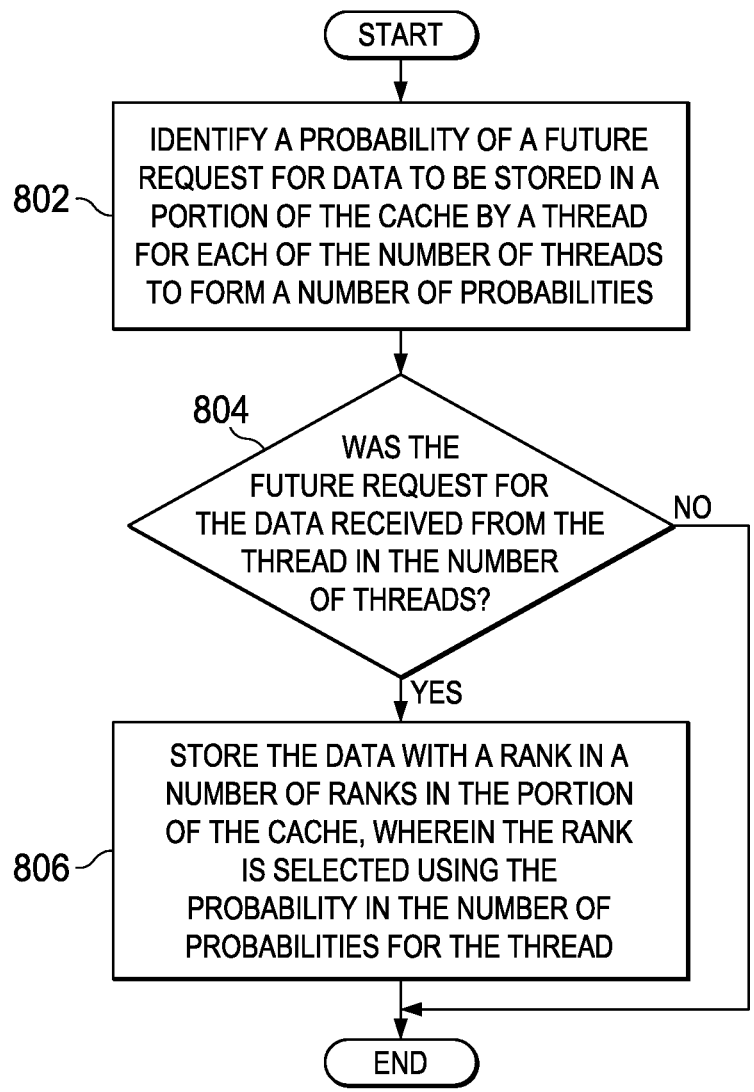
FIG. 8 is a flowchart of a process for managing a cache depicted in accordance with an illustrative embodiment.

Turning now to FIG. 8, a flowchart of a process for managing a cache is depicted in accordance with an illustrative embodiment. The process may be performed by cache management process 202 in cache management environment 200 in FIG. 2.

The process begins by identifying a probability of a future request for data to be stored in a portion of the cache by a thread for each of the number of threads to form a number of probabilities (step 802). The probability is a likelihood that a thread requests data, such as data 234 in FIG. 2, after the data is already stored in a portion of the cache. In other words, probability is the likelihood that the thread reuses data that is stored in the cache.

The process then determines whether a future request was received from the thread in the number of threads (step 804). The future request may be in a period subsequent to the period during which operation 802 was performed. In other words, if the measurement period is 900 cache accesses, operation 804 may be performed once the 900 cache accesses have occurred. If the process determines that the future request for the data was not received from the thread in the number of threads, the process terminates.

If the process determines that the future request for the data was received from the thread in the number of threads at step 804, the process stores the data with a rank in a number of ranks in the portion of the cache, wherein the rank is selected using the probability in the number of probabilities for the thread (operation 806). Selecting the rank using the probability may be performed by generating a random number weighted by a probability density function that was generated from the probability for the thread. The process terminates thereafter.

Figure 9:
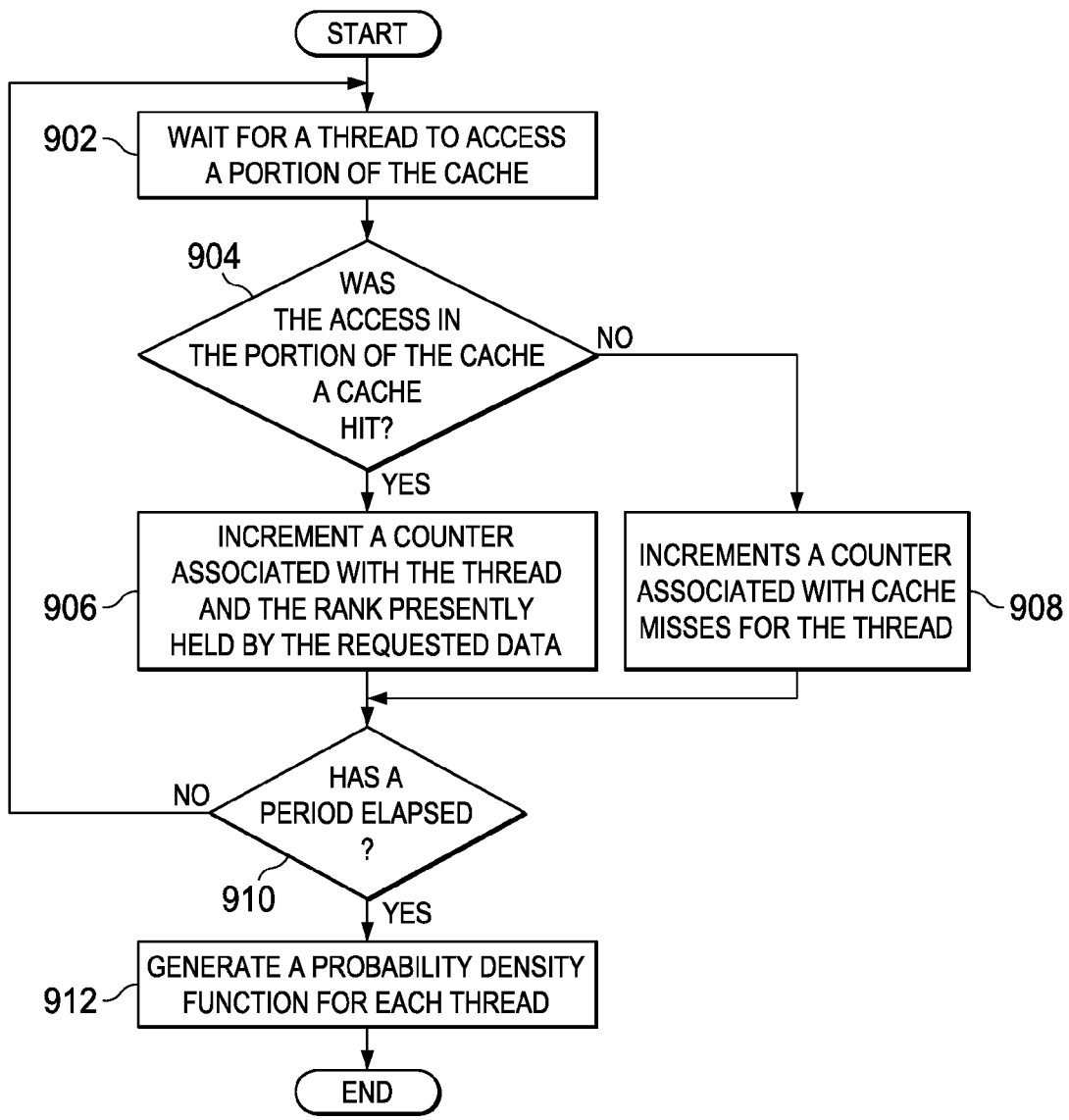
FIG. 9 is a flowchart of a process for identifying a probability of a future request for data to be stored in a portion of the cache by a thread for each of the number of threads to form a number of probabilities depicted in accordance with an illustrative embodiment.

Turning now to FIG. 9, a flowchart of a process for identifying a probability of a future request for data to be stored in a portion of the cache by a thread for each of the number of threads to form a number of probabilities is depicted in accordance with an illustrative embodiment. The process may be performed by cache management process 202 in cache management environment 200 in FIG. 2. The process is an example implementation of operation 802 from FIG. 8.

The process begins by waiting for a thread to access a portion of the cache (step 902). The portion may be a subset of the cache sets in the cache. The process then determines whether the access in the portion of the cache was a cache hit (step 904). In other words, the process determines whether the data requested by the thread was present in the portion of the cache. If the process determines that the access in the portion of the cache was a cache hit, the process increments a counter associated with the thread and the rank presently held by the requested data (step 906). For example, if the cache is an 8-way associative cache and the data requested by the thread is present in the cache with order of access rank 3, the process increments the counter associated with the particular thread and rank 3. The process then proceeds to step 910.

If the process determines that the access in the portion of the cache was not a cache hit at step 904, the process increments a counter associated with cache misses for the thread (step 908). A cache miss is an event that occurs when data requested by the thread is not present in the cache. The data may have to be loaded from main memory and stored in the cache. In these illustrative examples, the counter associated with cache misses is considered to be associated with the rank above the maximum rank. For example, in an 8-way associative cache where rank 1 is most recently accessed data and rank 8 is least recently accessed data, the counter associated with cache misses may be considered to be associated with rank 9.

The process then determines whether a period has elapsed (step 910). The period may be a period of time or a number of cache accesses. If the process determines that the period has not elapsed, the process returns to step 902. If the process determines that the period has elapsed, the process generates a probability density function for each thread (step 912). The probability density function may be generated using the counters associated with the thread. In one illustrative embodiment, the probability density function is generated by reflecting the number of counters over an axis located at a midpoint in the number of counters. For example, in an 8-way associative cache, each counter is reflected over an axis at rank 4. In other words, the value of the counter associated with rank 1 becomes the value for rank 8 in the probability density function. Likewise, the value of the counter associated with rank 8 becomes the value for rank 1 in the probability density function. The process terminates thereafter.

Figure 10:
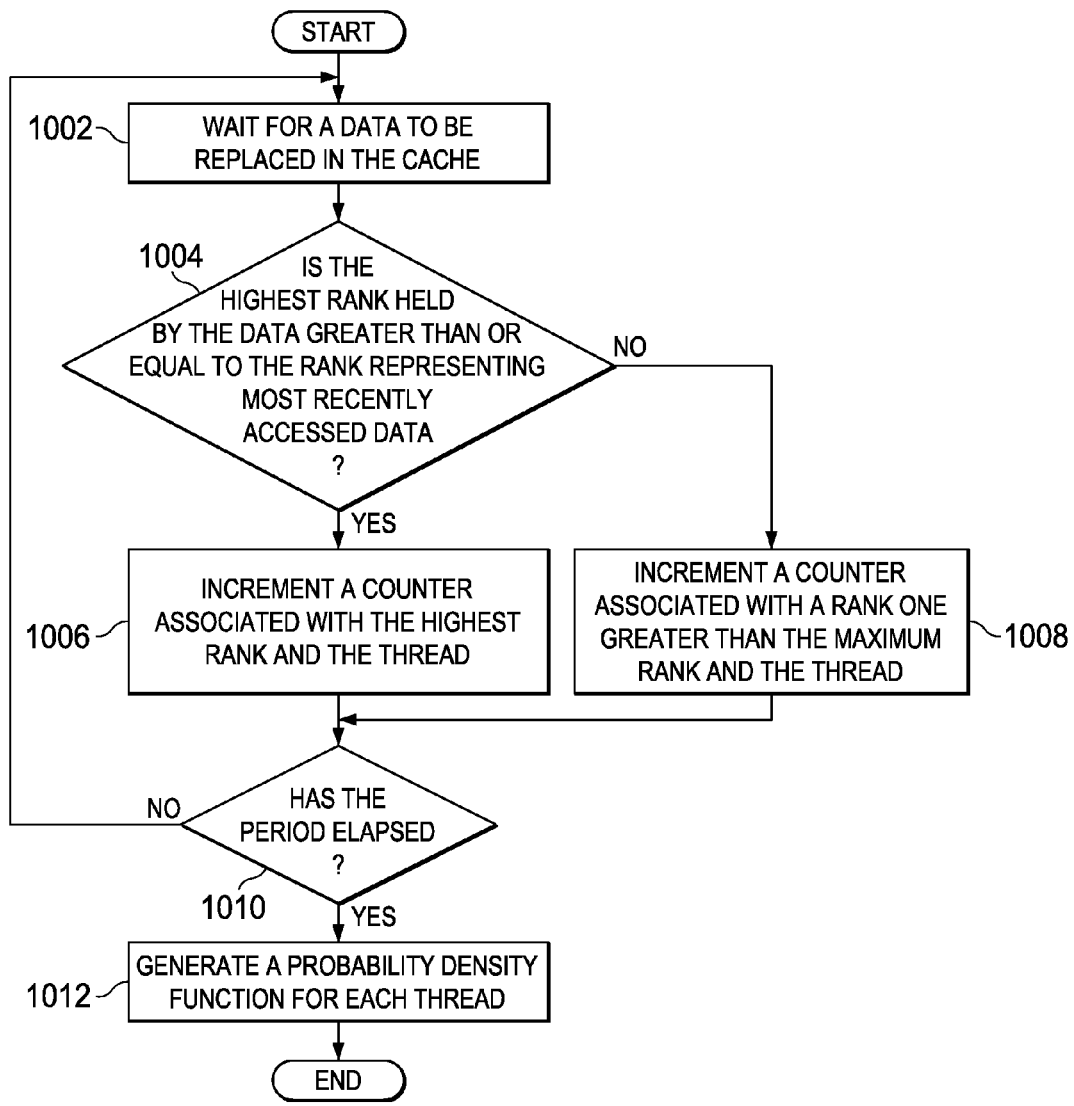
FIG. 10 is a flowchart of a second process for identifying a probability of a future request for data to be stored in a portion of the cache by a thread for each of the number of threads to form a number of probabilities depicted in accordance with an illustrative embodiment.

Turning now to FIG. 10, a flowchart of a second process for identifying a probability of a future request for data to be stored in a portion of the cache by a thread for each of the number of threads to form a number of probabilities is depicted in accordance with an illustrative embodiment. The process may be performed by cache management process 202 in cache management environment 200 in FIG. 2. The process is another example implementation of step 802 from FIG. 8.

The process begins by waiting for data to be replaced in the cache (step 1002). The data may be an example of data 238 in FIG. 2. Replacing the data may comprise overwriting data stored in the cache with data from memory or another cache requested by a thread. The process then determines whether the highest rank held by the data is greater than or equal to the rank representing most recently accessed data (step 1004). The highest rank may be a highest rank held by the data prior to being accessed by the thread, such as highest rank 244 in FIG. 2. In one illustrative embodiment, the process determines whether the data was accessed by the thread after the initial access that caused the data to be stored in the cache at step 1004.

For example, assume the cache is an 8-way associative cache. The rank of a first data is 1 when the data holds the rank of most recently accessed data. The rank of the first data is 8 when the first data is the least recently accessed data in the cache set. In this example, the first data is stored in the cache set with the rank of 1. Assume two other data are then stored in the cache set. After the two other data are stored in the cache set, the rank of the first data is 3. In this example, the first is then accessed by the thread that requested the first data. The process detects the access of the first and sets the highest rank of the first data to 3.

If the process determines that the highest rank held by the data is greater than or equal to the rank representing most recently accessed data at step 1004, the process increments a counter associated with the highest rank and the thread (step 1006). Continuing with the previous example, assume other data is stored in the cache set until the rank of the first data becomes 8. When the rank of the first data is 8, the rank of the first data represents the least recently accessed data in the cache set. When additional data is stored in the cache set, the first data is overwritten in the cache set. The process then increments the counter associated with rank 3 and the thread. The process then proceeds to step 1010.

If the process determines that the highest rank held by the data is less than the rank representing most recently accessed data at step 1004, the process increments a counter associated with a rank one greater than the maximum rank and the thread (step 1008). For example, assume the cache is an 8-way cache. Assume that the most recently accessed data is represented with rank 1 and the least recently accessed data is represented with rank 8. The maximum rank is 8. Thus, the counter associated with the rank one greater than the maximum rank is 9. The process increments the counter associated with the thread and rank 9.

The process then determines whether a period has elapsed (step 1010). The period may be a period of time or a number of cache accesses. If the process determines that the period has not elapsed, the process returns to operation 1002. If the process determines that the period has elapsed, the process generates a probability density function for each thread (operation 1012). The probability density function may be generated using the counters associated with the thread. In one illustrative embodiment, the probability density function is generated by reflecting the number of counters over an axis located at a midpoint in the number of counters. For example, in an 8-way associative cache, each counter is reflected over an axis at rank 4. In other words, the value of the counter associated with rank 1 becomes the value for rank 8 in the probability density function. Likewise, the value of the counter associated with rank 8 becomes the value for rank 1 in the probability density function. The process terminates thereafter.

Figure 11:
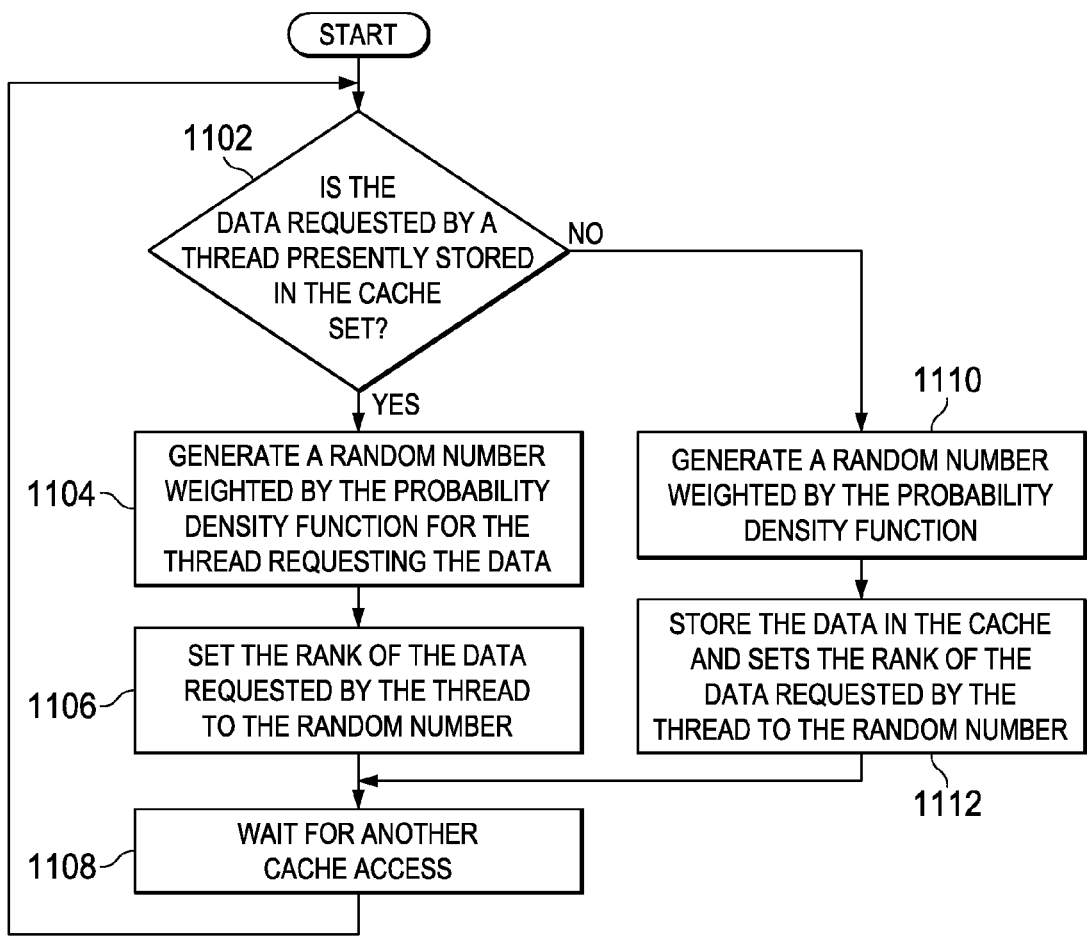
FIG. 11 is a flowchart of a process for storing the data with a rank in a number of ranks in the portion of the cache, wherein the rank is selected using the probability in the number of probabilities for the thread depicted in accordance with an illustrative embodiment.

Turning now to FIG. 11, a flowchart of a process for storing the data with a rank in a number of ranks in the portion of the cache, wherein the rank is selected using the probability in the number of probabilities for the thread is depicted in accordance with an illustrative embodiment. The process may be performed by cache management process 202 in cache management environment 200 in FIG. 2. The process is another example implementation of operation 806 from FIG. 8.

The process begins by determining whether data requested by a thread is presently stored in the cache set (step 1102). In these examples, the cache set is an example implementation of portion 268 in FIG. 2. The cache set may be a cache set to which a probability density function is applied, such as probability density function 216 from FIG. 2.

If the process determines that data requested by the thread is presently stored in the cache set, the process generates a random number weighted by the probability density function for the thread requesting the data (step 1104). The random number is an example implementation of random number 218 in FIG. 2. The process then sets the rank of the data requested by the thread to the random number (step 1106). The process then waits for another cache access (step 1108). When another cache access is received at step 1008, the process returns to step 1102.

If the process determines that data requested by the thread is not presently stored in the cache set, the process generates a random number weighted by the probability density function (step 1110). The random number is an example implementation of random number 218 in FIG. 2. The random number is an integer between 1 and the number of ways in the cache set. The process then stores the data in the cache and sets the rank of the data requested by the thread to the random number (step 1112). The process then advances to step 1108. It should be noted that the process may be terminated or interrupted by a number of events. For example, a user may terminate the process, or the process may terminate after a particular period of time. The process may also terminate if processor usage is above or below a threshold.

It should be noted that in other illustrative examples, the random number is an integer between 1 and the number of ways in the cache set+1. In such examples, when the random number has a value of the number of ways in the cache set+1, step 1112 is not performed. For example, assume the cache is an 8-way cache. The random number may be between 1 and 9. If the random number generated at step 1110 is 9, the process does not store the data in the cache.

The different illustrative embodiments allow a cache management process to manage a cache being used by a number of threads where each thread has a particular profile of cache use. The number of cache hits is improved over a cache management process that implements a least recently used replacement policy for all portions of the cache because the data requested by a thread is stored in the cache with a rank that corresponds to the probability of the thread accessing the data again. Data for a thread that reuses the same data very frequently is more frequently stored with ranks closer to most recently accessed data. On the other hand, data for a thread that accesses a lot of data only once is more frequently stored with ranks closer to least recently accessed data. Thus, there is a smaller likelihood that data for the first thread that is likely to be accessed again will be replaced by data for the second thread that is unlikely to be accessed again than under a least recently used cache replacement policy.

The different illustrative embodiments also allow a profile of cache use for a particular thread to change over time. Because the profile is generated for the thread during each period, the profile of cache use for the thread is consistent with the recent cache use of the thread.

Thus, the illustrative embodiments provide a method, a computer program product, and an apparatus for managing a cache. A probability of a future request for data to be stored in a portion of the cache by a thread is identified for each of the number of threads to form a number of probabilities. The data is stored with a rank in a number of ranks in the portion of the cache responsive to receiving the future request from the thread in the number of threads for the data. The rank is selected using the probability in the number of probabilities for the thread.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a cache, the method comprising:
   identifying a probability of a future request for data to be stored in a portion of the cache by a thread for each of the number of threads to form a number of probabilities, wherein the data is a first data, and wherein identifying the probability of the future request for the data to be stored in the portion of the cache by the thread for each of the number of threads to form the number of probabilities further comprises: responsive to a second data requested by the thread being present in the cache, incrementing a counter associated with the rank for the second data, wherein the counter is associated with the thread to form a number of counters; and
   responsive to receiving the future request from the thread in the number of threads for the data, storing the data with a rank in a number of ranks in the portion of the cache, wherein the rank is selected using the probability in the number of probabilities for the thread.

2. The method of claim 1, wherein the counter is a first counter, and wherein identifying the probability of the future request for the data to be stored in the portion of the cache by the thread for each of the number of threads to form the number of probabilities further comprises:
   responsive to the second data requested by the thread being absent from the cache, incrementing a second counter associated with the thread.

3. The method of claim 2, wherein a cache management process implements a least recently used cache replacement policy in the cache, wherein the number of ranks indicate an order of access from a most recently accessed data to a least recently accessed data in the portion of the cache.

4. The method of claim 2 further comprising:
   repeating the step of incrementing the first counter and the step of incrementing the second counter until a period has elapsed, wherein the period is selected from an amount of time and a number of cache accesses.

5. The method of claim 2, wherein the cache is an associative cache with n ways, and
   dividing each of the number of counters by a sum of the number of counters for the each thread; and
   reflecting the number of counters for the each thread over an axis at an n/2 counter in the number of counters to form a probability density function.

6. The method of claim 5, wherein storing the first data with a rank in a number of ranks in the portion of the cache responsive to receiving the future request from the thread in the number of threads for the first data further comprises:
   generating a random number weighted by the probability density function, wherein the random number is an integer between 1 and the n ways; and
   setting the rank of the first data in the cache to the random number.

7. The method of claim 5, wherein the second counter is in the number of counters.

8. The method of claim 1, wherein the data is a first data, and wherein identifying the probability of the future request for the data to be stored in the portion of the cache by the thread for each of the number of threads to form the number of probabilities further comprises:
   responsive to a second data in the cache being replaced, incrementing a counter associated with a highest rank held by the second data prior to being accessed, wherein the counter is associated with the thread to form a number of counters.

9. The method of claim 8, wherein the counter is a first counter, and wherein identifying the probability of the future request for the data to be stored in the portion of the cache by the thread for each of the number of threads to form the number of probabilities further comprises:
   responsive to the second data requested by the thread being absent from the cache, incrementing a second counter associated with the thread.

10. The method of claim 9, wherein the cache uses a least recently used cache replacement policy, wherein the number of ranks indicate an order of access from a most recently accessed data to a least recently accessed data in the portion of the cache.

11. The method of claim 1, wherein the portion is a cache set, and wherein identifying the probability of the future request for the data to be stored in the portion of the cache by the thread for each of the number of threads to form the number of probabilities is performed using a subset of cache sets in the cache.

12. A computer program product comprising:
    a computer readable storage medium;
    first program code, stored on the computer readable storage medium, for identifying a probability of a future request for data to be stored in a portion of the cache by a thread for each of the number of threads to form a number of probabilities, wherein the data is a first data, and wherein the first program code for identifying the probability of the future request for the data to be stored in the portion of the cache by the thread for each of the number of threads to form the number of probabilities further comprises: program code, stored on the computer readable storage medium, for, incrementing a counter associated with the rank for a second data responsive to the second data requested by the thread being present in the cache, wherein the counter is associated with the thread to form a number of counters; and second program code, stored on the computer readable storage medium, for storing the data with a rank in a number of ranks in the portion of the cache responsive to receiving the future request from the thread in the number of threads for the data, wherein the rank is selected using the probability in the number of probabilities for the thread.

13. The computer program product of claim 12, wherein the counter is a first counter, and wherein the first program code for identifying the probability of the future request for the data to be stored in the portion of the cache by the thread for each of the number of threads to form the number of probabilities further comprises:

program code, stored on the computer readable storage medium, for incrementing a second counter associated with the thread responsive to the second data requested by the thread absent from the cache.

14. The computer program product of claim 13, wherein a cache management process implements a least recently used cache replacement policy in the cache, wherein the number of ranks indicate an order of access from a most recently accessed data to a least recently accessed data in the portion of the cache.

15. The computer program product of claim 12, wherein the data is a first data, and wherein the first program code for identifying the probability of the future request for the data to be stored in the portion of the cache by the thread for each of the number of threads to form the number of probabilities further comprises:

program code, stored on the computer readable storage medium, for incrementing a counter associated with a highest rank held by a second data prior to being accessed responsive to the second data in the cache being replaced, wherein the counter is associated with the thread to form a number of counters.

16. The computer program product of claim 15, wherein the counter is a first counter, and wherein the first program code for identifying the probability of the future request for the data to be stored in the portion of the cache by the thread for each of the number of threads to form the number of probabilities further comprises:

program code, stored on the computer readable storage medium, for incrementing a second counter associated with the thread responsive to the second data requested by the thread being absent from the cache.

17. The computer program product of claim 16, wherein the cache uses a least recently used cache replacement policy, wherein the number of ranks indicate an order of access from a most recently accessed data to a least recently accessed data in the portion of the cache.

18. An apparatus, the apparatus comprising:
a bus system;
a number of storage devices connected to the bus system, wherein the number of storage devices includes program code; and
a processor unit connected to the bus system, wherein the processor unit executes the program code to identify a probability of a future request for data to be stored in a portion of the cache by a thread for each of the number of threads to form a number of probabilities, wherein the data is a first data, and wherein the program code to identify the probability of the future request for the data to be stored in the portion of the cache by the thread for each of the number of threads to form the number of probabilities further comprises: program code, wherein responsive to a second data requested by the thread being present in the cache, to increment a counter associated with the rank for the second data, wherein the counter is associated with the thread to form a number of counters; and store the data with a rank in a number of ranks in the portion of the cache responsive to receiving the future request from the thread in the number of threads for the data, wherein the rank is selected using the probability in the number of probabilities for the thread.

* * * * *